United States Patent [19]

Ruumpol

[11] Patent Number: 4,642,595
[45] Date of Patent: Feb. 10, 1987

[54] CONTACTLESS ELECTRIC CONTROL-HANDLE

[75] Inventor: Geurt J. Ruumpol, AB Wilp, Netherlands

[73] Assignee: Inductive Control Systems B.V., Ede, Netherlands

[21] Appl. No.: 726,690

[22] Filed: Apr. 24, 1985

[30] Foreign Application Priority Data

May 2, 1984 [NL] Netherlands ............... 8401391

[51] Int. Cl.[4] .............................................. H01F 21/06
[52] U.S. Cl. ................................... 336/135; 336/134; 200/6 A
[58] Field of Search ............ 336/30, 40, 130, 232, 336/134, 135; 323/347, 348; 324/207; 200/6 A; 340/365

[56] References Cited

U.S. PATENT DOCUMENTS

| | | | |
|---|---|---|---|
| 3,270,260 | 8/1966 | Mehr | 336/130 X |
| 4,421,997 | 12/1983 | Forys | 336/232 X |
| 4,425,511 | 1/1984 | Brosh | 336/73 X |
| 4,434,412 | 2/1984 | Ruumpol | 336/135 X |
| 4,453,124 | 6/1984 | Francis et al. | 323/347 |
| 4,462,015 | 7/1984 | Netzen | 336/130 X |
| 4,494,109 | 1/1985 | Bernin | 336/130 X |
| 4,544,803 | 10/1985 | Schaller | 336/135 X |

FOREIGN PATENT DOCUMENTS

| | | | |
|---|---|---|---|
| 1512207 | 2/1968 | France. | |
| 1569784 | 6/1969 | France. | |
| 335120 | 2/1959 | Switzerland | 336/135 |

Primary Examiner—Arthur T. Grimley
Assistant Examiner—C. Romano
Attorney, Agent, or Firm—John P. Snyder

[57] ABSTRACT

A contactless electric control handle having a field coil for forming an electro-magnetic field, inductive pick-up coils angularly spaced apart around the axis of the field. The rod of the control handle constitutes the core of the field coil. The field coil and the pick-up coils have the shape of annular, concentric conductors, whereas ferrite is applied to the rod in order to employ high frequencies up to 1 MHz.

9 Claims, 1 Drawing Figure

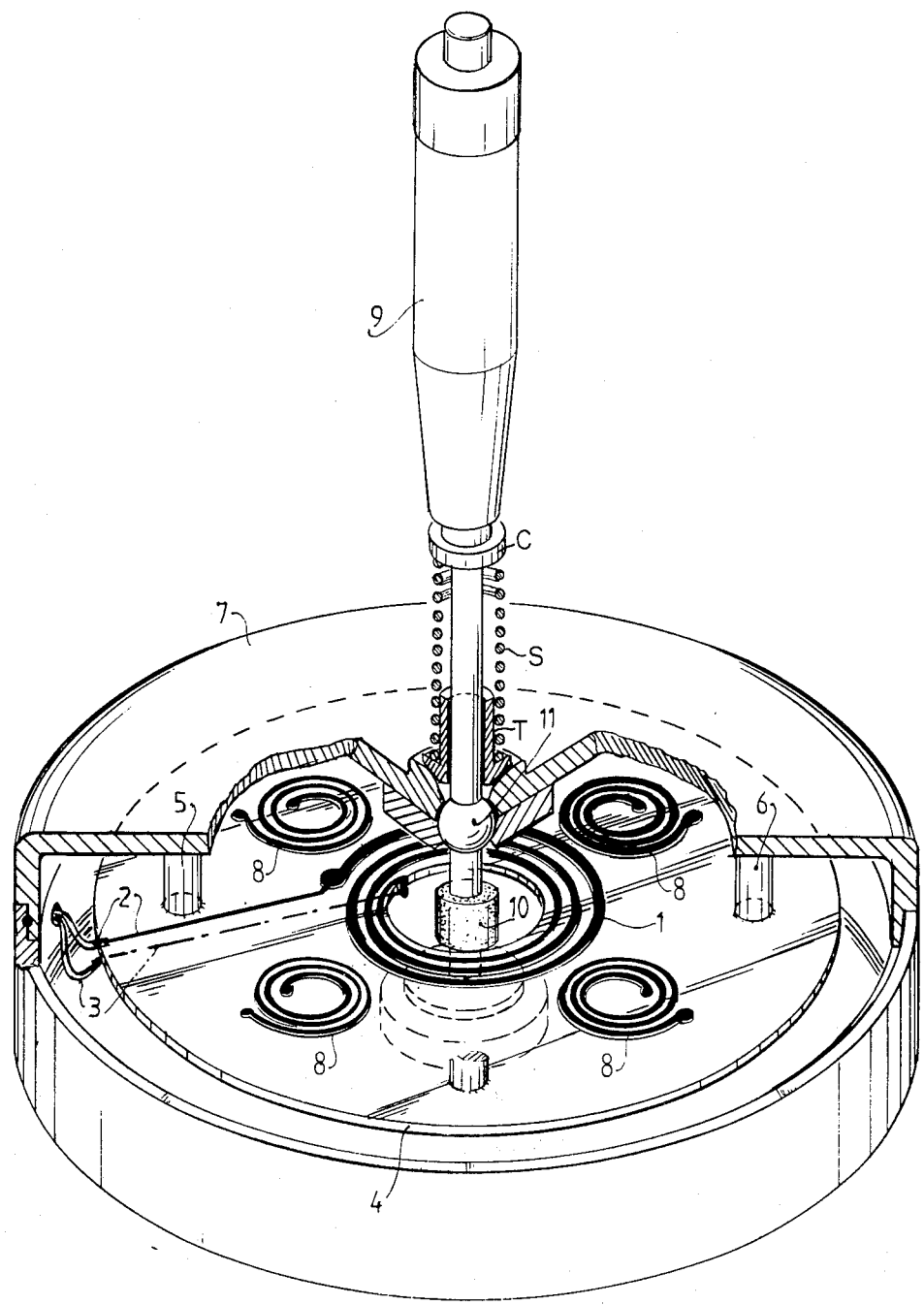

CONTACTLESS ELECTRIC CONTROL-HANDLE

The invention relates to a contactless electric control handle, comprising a field coil for producing an alternating electro-magnetic field, a plurality of pairs of inductive pick-up coils, said coils being angularly spaced apart around the axis of said field coil and having a rod for the control handle, constituting the core of the field coil and affecting the electro-magnetic field in a manner which varies in dependence on the position of said rod.

A control handle of the kind set forth is known from European Pat. No. 0 041 281.

Although known control handle meets the requirements in practice, there is a need for a control handle which can be manufactured in a cheaper way.

According to this invention this is achieved in that said field coil and pick-up coils have the shape of annular concentric conductors being applied to a base plate and in that ferrite has been applied to the rod.

By applying concentric conductors to be applied by etching for instance, a considerably cheaper production is achieved. The number of conductors is necessarily limited, however.

In order to obtain an adequate field and an adequate output signal from the pick-up coils, higher frequencies are required, eg. 1 MHz instead of 2 KHz, which is only possible as a result of ferrite material being applied to the rod. The field coil and the pick-up coil can be applied on the same place and are consequently situated in the same plane. It is possible, for instance to apply the field coil to one side and the pick-up coil to the other side of the base plate. The invention will be described more fully with reference to the drawing.

BRIEF DESCRIPTION OF THE DRAWING FIGURE

The drawing is a perspective view, partly broken away, illustrating the assembly according to the invention.

DETAILED DESCRIPTION OF THE INVENTION

The coil 1 is provided with connecting wires 2 and 3 for connection to an alternating-current source. When current passes the coil 1 will build up an electro-magnetic field. The coil 1 is applied to a base plate 4, by etching for instance, said base plate being supported by frame 7 by means of supports 5 and 6. In addition pick-up coils, 8 for instance, have been applied which like the coil 1 consist of concentric conductors, etched to the plate. The pick-up coils 8 are connected to a processor by means of connecting wires which are not shown in the drawing. The rod 9 extends into the field of the coil 1 and shows a part of the ferrite material 10.

On moving the rod 9 around the centre of rotation 11, the field enclosed by the pick-up coils is altered. The signal produced in the pick-up coil 8 is in proportion to the position of the rod 9. Each coil is of spiral-like form with the field coil 1 being centered with respect to the ferrite portion 10 of the control handle when the control handle is in a neutral position. The inductive pick-up coils 8 are disposed outwardly of the filed coil 1 in uniformly distributed fashion therearound. The control handle is normally disposed in its neutral position by means of the spring S acting between the collar C and the sleeve T so that when released by the operator, it returns to its neutral position.

What we claim is:

1. A contactless electric control handle assembly comprising the combination of:
    a housing having a control handle support portion;
    a control handle having universal joint means cooperating with said support portion for presenting a universally movable control part projecting from one side of said support portion and an extension projecting from the other side of said support portion, said extension having a ferrite core portion, and means for normally positioning said universally movable control part, and consequently said ferrite core portion, in a neutral position relative to said support portion;
    base plate means carried by said housing for cooperation with said control handle;
    said base plate means having an opening within which said ferrite core portion is received with clearance to allow universal movement of said ferrite core portion relative to said base plate means in response to universal manipulation of said movable control part;
    a field coil on said base plate means and centered with respect to said ferrite core portion when it is in said neutral position thereof, said field coil comprising a conductor of generally flat, spiral-like form adapted to produce an alternating electromagnetic field; and
    a set of inductive pick-up coils on said base plate means in outwardly spaced relation from said field coil and uniformly distributed therearound for equal inductive pick-up from said alternating electromagnetic field when said ferrite core portion is in its neutral position, each of said inductive pick-up coils comprising a conductor of generally flat, spiral-like form.

2. A contactless control handle assembly as defined in claim 1 wherein said base plate means comprises a single base plate and all of said coils are formed directly thereon.

3. A contactless control handle assembly as defined in claim 2 wherein said field coil is formed on one side of said base plate and said inductive pick-up coils are formed on the opposite side of said base plate.

4. A contactless electric control handle assembly comprising the combination of:
    a housing and a control handle universally mounted thereon, said control handle having a manually engagable portion and a ferrite portion;
    coil means mounted in said housing for cooperation with said ferrite portion, said coil means including a field coil surrounding said ferrite portion and centered with respect thereto in one position of said field coil, and a plurality of inductive pick-up coils spaced outwardly from said field coil and uniformly disposed therearound; and
    each of said coils being of generally planar, strip-like form.

5. A contactless control handle assembly as defined in claim 4 including a base plate providing a common support for all of said coils.

6. A contactless control handle assembly as defined in claim 5 wherein said coils are etched on said base plate.

7. A contactless control handle assembly as defined in claim 6 wherein said field coil is formed on one side of said base plate and said inductive pick-up coils are formed on the opposite side of said base plate.

8. A contactless control handle as defined in claim 7 wherein each of said coils is of spiral-like form.

9. A contactless control handle as defined in claim 6 wherein each of said coils is of spiral-like form.

* * * * *